(12) United States Patent
Panse et al.

(10) Patent No.: US 12,380,011 B2
(45) Date of Patent: Aug. 5, 2025

(54) METHODS AND SYSTEMS FOR SENSOR-ASSISTED MONITORING OF TEMPORAL STATE OF DEVICE

(71) Applicant: ArgusIOT Inc., Sunnyvale, CA (US)

(72) Inventors: Parag Panse, Sunnyvale, CA (US); Ulf Stroberg, Sunnyvale, CA (US)

(73) Assignee: ArgusIOT Inc., Sunnyvale, CA (US)

( * ) Notice: Subject to any disclaimer, the term of this patent is extended or adjusted under 35 U.S.C. 154(b) by 0 days.

(21) Appl. No.: 18/187,593

(22) Filed: Mar. 21, 2023

(65) Prior Publication Data
US 2023/0297483 A1 Sep. 21, 2023

Related U.S. Application Data

(60) Provisional application No. 63/322,103, filed on Mar. 21, 2022.

(51) Int. Cl.
| | | |
|---|---|---|
| G06F 11/00 | (2006.01) | |
| G06F 11/07 | (2006.01) | |
| G06F 11/30 | (2006.01) | |

(52) U.S. Cl.
CPC ...... G06F 11/3075 (2013.01); G06F 11/0772 (2013.01)

(58) Field of Classification Search
CPC .......................... G06F 11/0772; G06F 11/3075
USPC ....................................................... 714/1–57
See application file for complete search history.

(56) References Cited

U.S. PATENT DOCUMENTS

| | | | | |
|---|---|---|---|---|
| 6,965,916 B1* | 11/2005 | Kling | ................. | H04L 12/1868 |
| | | | | 370/216 |
| 10,706,484 B1* | 7/2020 | Murnock | ............ | G06F 3/04847 |
| 2005/0157325 A1* | 7/2005 | Choi | ................. | G06F 11/0748 |
| | | | | 358/1.14 |
| 2013/0298244 A1* | 11/2013 | Kumar | ................... | G06F 21/51 |
| | | | | 726/25 |
| 2015/0288557 A1* | 10/2015 | Gates | ................. | G06F 11/0709 |
| | | | | 714/37 |
| 2016/0246266 A1* | 8/2016 | Kniazev | ............... | H04N 19/124 |
| 2017/0249200 A1* | 8/2017 | Mustafi | ............... | G06F 11/0709 |
| 2017/0286497 A1* | 10/2017 | Crabtree | ................ | H04L 67/12 |
| 2018/0019910 A1* | 1/2018 | Tsagkaris | .............. | H04W 24/02 |
| 2018/0373841 A1* | 12/2018 | Harpale | ................ | G16H 50/20 |
| 2020/0162559 A1 | 5/2020 | Sustaeta et al. | | |
| 2020/0192337 A1* | 6/2020 | Hoffman | .......... | G05B 19/41865 |
| 2020/0249640 A1* | 8/2020 | Muraleedhara | .... | G05B 13/0275 |

(Continued)

OTHER PUBLICATIONS

International Search Report and Written Opinion for International Patent Application No. PCT/US2023/015795, dated Jun. 22, 2023 (11 pages).

*Primary Examiner* — Sarai E Butler
(74) *Attorney, Agent, or Firm* — Goodwin Procter LLP

(57) ABSTRACT

A method for monitoring a temporal state of a device includes collecting a set of timeseries data within a time window, the timeseries data being collected from a sensor associated with the device, generating temporal states of the device within the time window based on the set of timeseries data, generating an actionable insight based on the temporal states of the device within the time window, and forwarding the actionable insight to a corresponding entity. The temporal states of the device are generated by running a state specification that includes a set of state definitions for defining different states of the device.

20 Claims, 8 Drawing Sheets

(56) References Cited

U.S. PATENT DOCUMENTS

| | | |
|---|---|---|
| 2020/0371491 A1 | 11/2020 | Wong |
| 2021/0241926 A1 | 8/2021 | Chor et al. |
| 2022/0318124 A1* | 10/2022 | Mathukumar ......... G06N 20/00 |
| 2023/0095634 A1* | 3/2023 | Muralidharan ..... G06F 11/0784 |
| | | 714/57 |

* cited by examiner

Pie chart showing aggregated time spent in 3 states (b)

Bar chart showing time spent in 2 states in successive 30 sec time window (a)

METHODS AND SYSTEMS FOR SENSOR-ASSISTED MONITORING OF TEMPORAL STATE OF DEVICE

CROSS REFERENCE TO RELATED APPLICATION

The application claims the benefit of and priority to U.S. Provisional Application No. 63/322,103 filed Mar. 21, 2022, and entitled "METHOD AND SYSTEMS FOR ANALYZING TIMESERIES DATA TO EXTRACT INSIGHTS AROUND TEMPORAL STATES AND EVOLUTION OF THOSE STATES," the content of which is hereby incorporated by reference in its entirety.

TECHNICAL FIELD

This disclosure generally relates to process automation, and more particularly to methods and systems for real-time monitoring of temporal states of sensor-equipped devices for improved automation.

BACKGROUND

Supervisory control and data acquisition (SCADA) is a system of software and hardware elements designed for industrial organizations to monitor or control industrial processes locally or at remote locations, monitor, gather, and process real-time data, and directly interact with devices such as sensors, valves, pumps, motors, or other devices through human-machine interface (HMI). For example, the SCADA systems may allow to process, distribute, and display data obtained from sensors, thereby assisting operators and other employees to monitor devices equipped with sensors when they analyze data and make important decisions. While SCADA systems allow industrial organizations and companies in the public and private sectors to control and maintain efficiency and distribute data for smarter decisions, human monitors are generally required to obtain insights from the data collected from sensors in decision-making and action-taking processes. This can be time consuming and sometimes can cause serious problems for operating machines or devices if the data is timely analyzed for instant action. Therefore, there is a need for better device monitoring systems.

SUMMARY

To address the aforementioned shortcomings, a method and a system for monitoring a temporal state of a device are provided. The method includes collecting a set of timeseries data within a time window, the timeseries data being collected from a sensor associated with the device, generating temporal states of the device within the time window based on the set of timeseries data, generating an actionable insight based on the temporal states of the device within the time window, and forwarding the actionable insight to a corresponding entity. The temporal states of the device are generated by running a state specification that includes a set of state definitions for defining different states of the device.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to some embodiments by way of illustration only. It should be noted that from the following discussion, alternative embodiments of the structures and methods disclosed herein will be readily recognized as viable alternatives that may be employed without departing from the principles of the present disclosure.

Reference will now be made in detail to specific embodiments, examples of which are illustrated in the accompanying figures. It should be noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
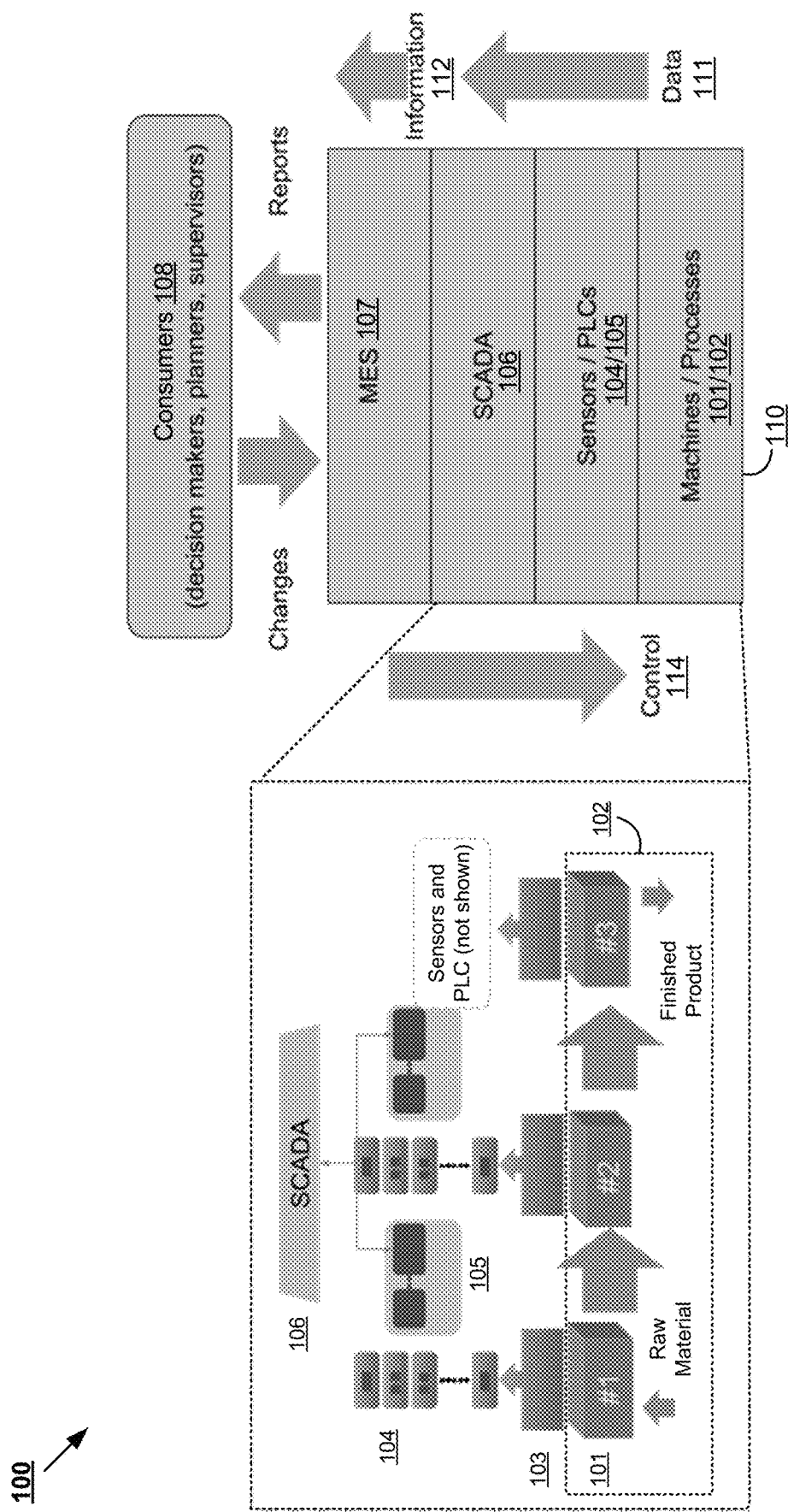
FIG. 1 depicts a block diagram of an example data flow in an existing supervisory control and data acquisition system.

FIG. 1 is a block diagram of an example existing supervisory control and data acquisition (SCADA) architecture 100. Specifically, box 102 in FIG. 1 illustrates an example process composed of three machines 101 working in tandem to produce a product. The arrows in box 102 depict how raw material entering machine #1 is moved from machine to machine until the finished product is generated at machine #2. The movement of a semi-finished product from one machine to another may be fully automated, e.g., a belt that is continuously running or partially automated or not automated at all. In one example, a human may physically move the semi-finished product from one machine to the next machine 101.

To ensure that each machine 101 operates within set points and that raw material transformation is within specification, critical parts of the above process are continuously monitored. For example, each machine 101 may be connected to one or more sensors 104 through sensor connection 103. Sensors 104 can be simple sensors or advanced sensors, which may be categorized based on the output reporting capacities of the sensors. Structurally, every sensor has a probe to sense the parameter of interest and a transducer that converts the sensed information into an electrical signal. This electrical signal is then output as analog or digital data, depending on the configuration. The advanced sensors may perform complex processing of the inputs, e.g., Fast Fourier Transform of the digital signal.

The analog signal output from the sensors 104 is usually either voltage or current. Industry standard for the output analog signal is 0-10 V or 4-20 mA current loop. The digital output is usually RS-232 or RS-485. Under certain circumstances, Ethernet or variants of ethernet (e.g., ProxiNet®) may be configured to support sensors 104 for communications. The actual communication protocol (e.g., the data framing) used to read data via the Ethernet interface may be MODBUS over TCP.

As illustrated in FIG. 1, a common deployment mode for the sensors 104 is where these sensors are connected to a programmable logic controller (PLC) 105. PLCs 105 have embedded microcontrollers that communicate with an array of objects such as factory machines (e.g., machines 101), sensors (e.g., sensors 104), and end devices, and then route the information from these objects to computers with SCADA software (together referred to as "SCADA device 106"). From an analytics perspective, a PLC may be considered as a multiplexer that reads data from individual sensors or other objects. PLCs have a communication bus over which instructions may be sent to sensors or other objects to read/write data. Ethernet or variants of ethernet may be used for reading and writing data by PLCs 105.

SCADA device 106 may be configured to control process operations (e.g., processes in box 102) in highly automated plants. If data acquisition has been configured in the SCADA device, then data from the sensors (e.g., sensors 104) may be read continuously and written to a data store. As illustrated in FIG. 1, the above-described elements (e.g., machines 101, processes 102, sensors 104, PLCs 105, and SCADA device 106) may be abstracted into an industrial information stack 110 that captures the information flow within an industrial setting. As also illustrated in FIG. 1, besides the aforementioned elements, the industrial information stack 110 may additionally include a manufacturing execution system (MES) 107, which is associated with consumers 108 such as human decision-makers, planners, supervisors, process experts, etc., in the industrial setting.

A manufacturing execution system generally is a computerized system used in manufacturing to track and document the transformation of raw materials to finished goods. MES provides information that helps manufacturing decision-makers understand how current conditions on the plant floor can be optimized to improve production output. MES works as a real-time monitoring system to enable the control of multiple elements of the production process (e.g. inputs, personnel, machines, and support services). In the industrial information stack 110, data 111 collected from machine 101 may flow from machine 101 to the SCADA device 106. The MES system 107 then converts data into information 112 such as human-readable media or human-readable format that is reported to the consumers 108. Based on the information provided by the MES system 107, consumers 108 may drive changes such as new schedules and/or new configurations to monitor and/or control machines 101. These new schedules and/or new configurations may be converted into control signals 114 by the layers below and eventually become set points in machines 101 that control the processes 102 of the machines.

Form the above, it can be seen that in the existing SCADA architecture 100, the information collected from machines 101 and associated processes 102 is generally passed through the SCADA device 106 and/or MES system 107 without much information processing. That is, data or human-readable information are provided to consumers 108 without insights derived from the data or information. A human consumer needs to make decisions and/or drive changes by manually manipulating the data, e.g., analyzing the data and identifying the insightful information from the data reported from machines 101 and/or the associated processes 102.

The existing SCADA architecture thus has technical problems in the automatic monitoring of the manufacturing processes. For example, in the existing SCADA architecture, data is siloed and not ready for analysis, and factories still rely on human monitors to watch live data streams, unpack data and perform data processing and further analysis, all of which require human involvement. That is, the existing SCADA-based industrial information stack is designed not for big data analytics and artificial intelligence (AI) and machine learning (ML) modeling, since timeseries data collected from sensors is not ready for processing by big data analytics and AI/ML modeling without human manipulation. In other words, in the existing SCADA-based industrial information stack, human involvement is an essential part of data processing. In such circumstances, the information carrying important messages or problems that require immediate actions may be delayed to some extent or totally ignored, depending on how information is delivered to the responsible entities and/or how quickly the entities responsible for addressing the problems can identify problems from the data and/or take actions. This may unnecessarily cause problems and/or lower efficiency of industrial production due to the lower-than-expected performance of the machines.

To address the technical problems in the existing SCADA architecture, the technical solutions disclosed herein provide temporal state monitoring methods and systems where timeseries data from machine operations may be processed in a way that is ready for algorithm-based data analysis such as big data analysis. In accordance with the disclosed methods and systems, a temporal state monitoring system may be configured to automatically generate insights from the timeseries data based on the automatic processing and analyzing of the data acquired from the sensors and/or the associated processes. In conditions where the generated insights indicate immediate actions to be taken, the temporal state monitoring system may further automatically generate drivable actions based on the insights automatically extracted from the timeseries data. The drivable actions may be forwarded to the respective autonomous process control for immediate attention. For example, the drivable actions may be communicated to an autonomous process control unit coupled to the machines, which may further generate control signals to control the corresponding machines for necessary actions, e.g., automatic adjustment of operation parameters of the machines 101.

In some embodiments, the temporal state monitoring system disclosed herein may be equipped with AI/ML modeling for extracting insights from the timeseries data obtained from machines. The manufacturing process is a highly complicated sector, with swiftly-changing machines and complex systems that have a lot of moving parts. AI/ML modeling in manufacturing may power predictive analytics and predictive maintenance beyond automated processes, which help make manufacturing plants more efficient, profitable, and safe.

The disclosed technical solutions show advantages over other existing SCADA architectures in monitoring industrial machines. For example, the disclosed temporal state monitoring systems may automatically extract insights in real-time based on the timeseries data collected from machines, without much human manipulation in data process and analysis, which then makes the autonomous control processes more responsive, and thus makes the whole manufacturing process closer to the real automation.

In addition, certain applications (such as JSON file implementations) included in the temporal state monitor system may unpack the timeseries data to make these data ready for AI/ML modeling, which not only improves the automation process, but also makes the whole manufacturing system smarter. For example, with AI/ML models, the disclosed temporal state monitoring system may estimate the best intervals for maintenance scheduling, predict potential risks or spot early signs of anomalies or failure, and thus may take action in advance in view of potential risk, anomalies, or failure. Other advantages of the disclosed temporal state monitoring systems may include but are not limited to, dynamic optimization of parameters for machines, and dynamic optimization of schedules in case of breakdowns or new orders, among others.

It is to be noted that the benefits and advantages described herein are not all-inclusive, and many additional features and advantages will be apparent to one of ordinary skill in the art in view of the figures and the following descriptions.

Figure 2:
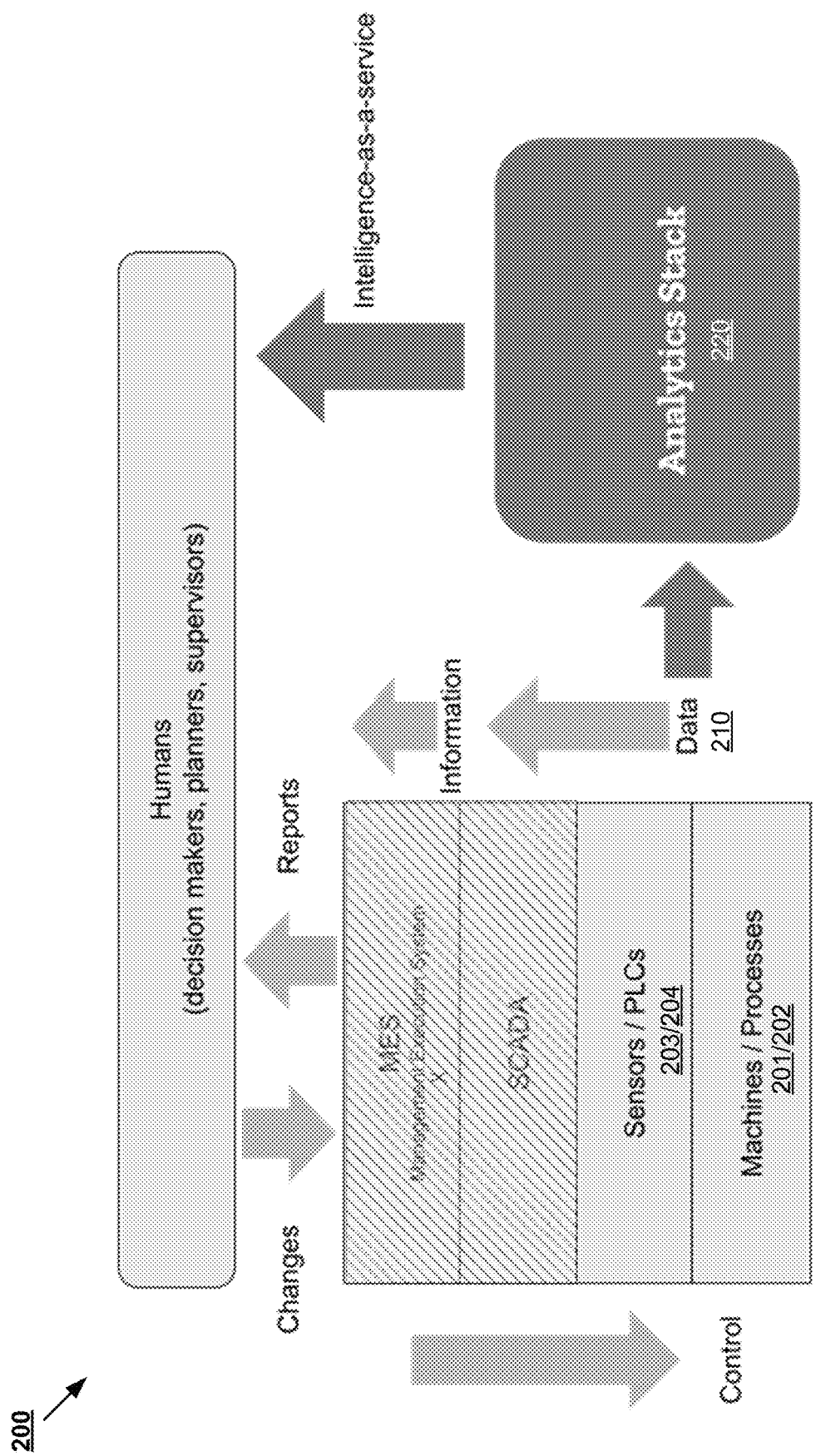
FIG. 2 depicts a block diagram of an example data flow in a temporal state monitoring system, according to embodiments of the disclosure.

FIG. 2 illustrates an example temporal state monitoring system 200, according to some embodiments. As shown in the figure, in the temporal state monitoring system 200, data collected by the sensors 203 associated with the machines 201 and processes 202 are communicated by the PLCs 204 to an analytics stack 220, but not to a SCADA architecture and associated MES as illustrated in FIG. 1. The analytics stack 220 may have an intelligence engine that is configured to proceed the data 210 received from the sensors and generate valuable insights from the sensor data. For example, the analytics stack 220 may include one or more subsystems for temporal state processing. A first subsystem may include formal description, which gives the ability to any user to specify a set of temporal states and the rules governing that specification (i.e. the grammar). A second subsystem is a runtime system, which realizes the formal description into a collection of runtime objects that read timeseries data and compute the states. The algorithm embedded at the heart of the runtime system is the analysis system intersection process, as will be described more in detail later. In some embodiments, to compute the temporal states for machines, an algorithm may be specifically configured to perform an intersection process, which merges results with a state definition expression configured for the temporal state computation based on the timeseries data. In some embodiments, the components associated with the data processing and analysis may be also referred to as an "analysis system," among which the components specifically associated with the intersection processes in temporal state computation may be referred to as a "runtime system" included in the analysis system. The specific functions of the runtime system are further descried in detail below.

Specifically, the temporal state for a machine may be defined by using a state specification that includes one or more state definitions, each defining a specific state of the machine among all possible states of the machine (together may be referred to as a "state set"). For each state definition, there may exist one or more statements, each statement defining a relationship between the values of one set of timeseries data (which may be simply referred to as "timeseries" and may include timeseries data read from a sensor associated with the machine) and an associated constraint for defining a specific state of the machine. Here, a constraint may be a threshold value, above which or below which a machine may operate in a different state or operate anomaly. Consider the following Table 1 for example timeseries for a vibration sensor data denoted by the symbol "p":

TABL 1

Example timeseries for a vibration sensor

| Time | | | | | | | | | | | | | | |
|---|---|---|---|---|---|---|---|---|---|---|---|---|---|---|
| 10 | 20 | 30 | 40 | 50 | 60 | 70 | 80 | 90 | 100 | 110 | 120 | 130 | 140 | 150 |
| Value 90 | 120 | 70 | 120 | 150 | 140 | 160 | 110 | 95 | 75 | 85 | 95 | 120 | 130 | 170 |

If the constraint for the vibration senor is denoted by the symbol "k" and if the constraint is set to k=100, above which erratic behavior (e.g., making a noise) of the vibration sensor may start, then one of the possible states for the vibration sensor may be defined using the state expression: $S(t1, t2, D): p>k$. The expression may be read as: temporal state S is computed every D units (which may vary depending on the specific sensor) of time over the time window (t1, t2) to compute for how long the condition "p>k" is true. This then provides insight into how long the machine was vibrating during the time window (t1, t2).

Figure 4:
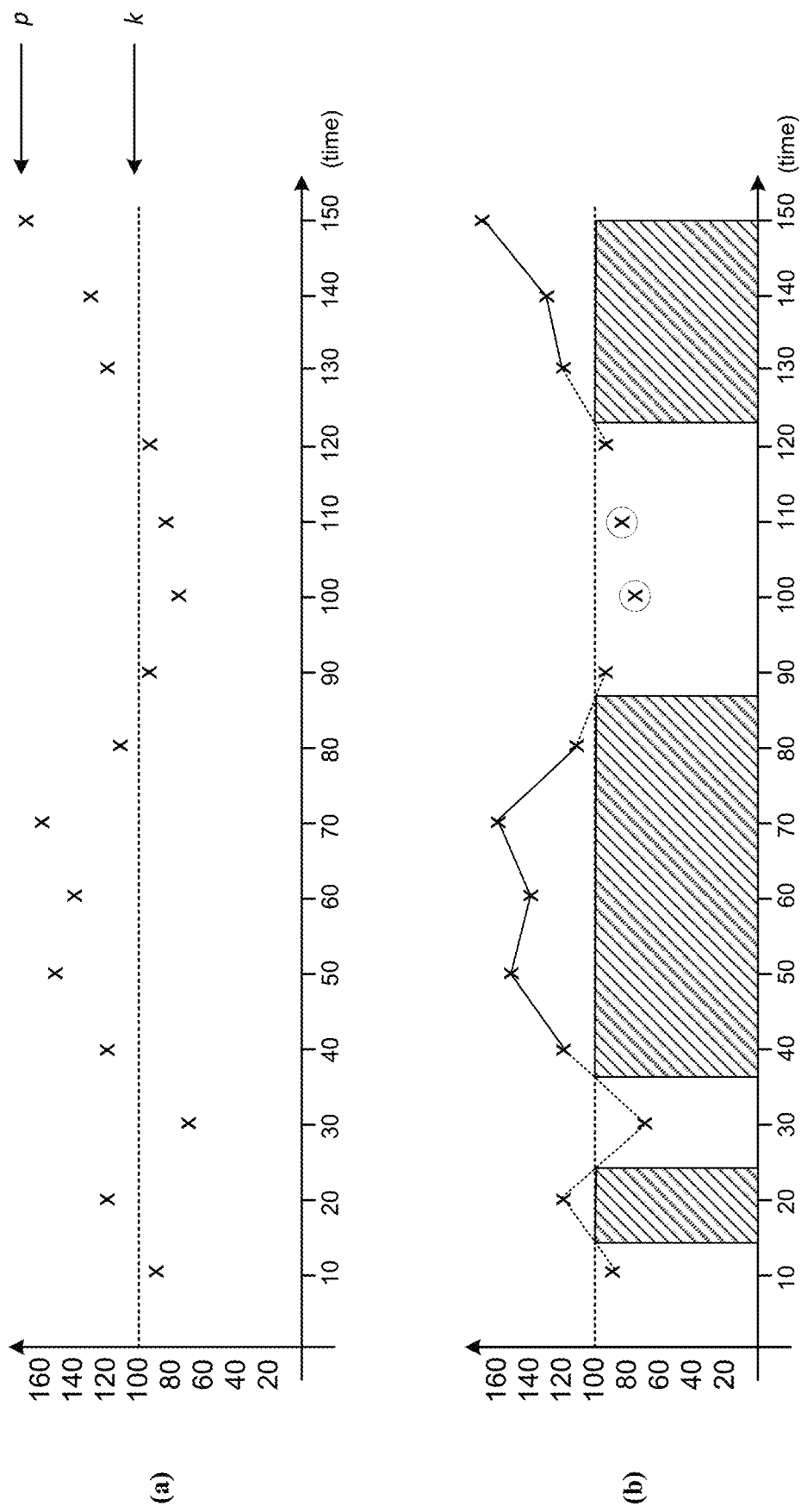
FIG. 4 depicts an example application scenario for determining a temporal state of a device, according to embodiments of the disclosure.

FIG. 4 further depicts two plots for illustrating how the specific state of the vibrator is determined in the above example. Specifically, Part (a) of FIG. 4 illustrates the timeseries p and constraint k, and Part (b) of FIG. 4 illustrates the temporal state S1 that gets computed as a result of p>k, as indicated by the three filled bars corresponding to the time periods for one specific state of $S(t1, t2, D):p>k$ for the vibrator. The total time length calculated from the three filled bars is the determined time for how long the machine was vibrating during the time window (t1, t2).

Here the following is another example that uses an extruder machine to illustrate how a machine can be in different states and how each state in the state set can be determined based on certain expressions. For an extruder machine, it may have two different states, a productive state and a non-productive idle state. Both states assume that the extruder machine is powered on. For an extruder machine to be in a productive state, the following four conditions should be met: 1) its power is on; 2) the melt temperature is at least 115° C.; 3) the screw is rotating at a minimal speed of 10 rotations per minute, and the line is running at a speed of at least 5 meters per minute. On the other hand, for an extruder machine to be in a non-productive idle state, the following three conditions should be met: 1) its power is on; 2) the melt temperature is at least 115° C.; and 3) the screw is not rotating. The grammar for defining a state set for the extruder machine may be as follows:

state_set={t_state_1, t_state_2, . . . } (where t_state=Temporal State)
t_state_i=expression
expression=stmt_1 j_op stmt_2 j_op stmt_3 . . . .
stmt_i=timeseries_id f_op constant
timeseries_id={p, q, r, . . . are timeseries ids as defined in TAL}
j_op=one_of{andand, AND}
f_op=one_of {<, >, <=, >=, ==}

As can be seen, when there is only one constraint and one set of timeseries data, different states in a state set may be non-overlapping, which means that the associated device is only in one of the states included in the state set at any time point, but may not be in two sets included in the state set simultaneously.

In some embodiments, depending on the specific machine and running parameters that can be monitored by sensors and can be used to define the operating states of the machine, there may be a different number of expressions that can be used to define a temporal state. In one example, a state for a machine can be defined using three expressions, which may be as follows: S(t1, t2); p>k1 and q<k2 and r>=k3. These three expressions can be read as: over the time window (t1, t2), for a machine to be in the state S, all three constraints are expected to meet: 1) values in timeseries p are greater than k1, 2) values in timeseries q are smaller than k2; and 3) values in timeseries r are greater than or equal to k3. In applications, since the time window (t1, t2) can be any time arbitrary, using (t1, t2) may be dropped from the state definition, which makes the state definition like this: S: p>kJ and q<k2 and r>=k3. The definition may be considered true (i.e., may be applicable) over any time window, as long as the time window is greater than the data collection period.

In some embodiments, a state set may be also defined as a combination of (timeseries, constants, f_op) defining the overall feasible state space (i.e., all possible states of a machine or device). Here the following is a table (Table 2) that defines different state sets using six examples:

TABLE 2

Examples of different state sets

| Timeseries and Constraints | Possible State Collections | Observations |
| --- | --- | --- |
| Timeseries: p<br>Constant: k | SS1 = {S1, S2, S3}, where<br>S1: p > k<br>S2: p == k<br>S3: p < k<br>SS2 = {S1, S2}, where<br>S1: p >= k<br>S2: p < k<br>SS3 = {S1, S2}, where<br>S1: p <= k<br>S2: p > k<br>SS4 = {S1, S2}, where<br>S1: p > k<br>S2: p < k | 1. States defined in the state sets do not intersect each other.<br>2. Using just 1 timeseries, 1 constant, and a different set of F_op, different states may be defined.<br>3. Its ok to leave a certain part of the state space undefined, e.g., in SS4, the "p == k" is not used. |
| Timeseries: {p, q}<br>Constant: k1, k2 | SS5 = {S1, S2, S3, S4} where<br>S1: p > k AND q > k2<br>S2: p <= k1 AND q > k2<br>S3: p > k2 AND q <= k2<br>S4: p <= k2 AND q <= k2<br>SS6 = {S1, S2, S3} where<br>S1: p > k1<br>S2: p <= k2 AND q > k2<br>S3: p > k2 AND q <= k2 | 4 permutations with constraints completely cover the full state space:<br>C1 \| C2<br>p > k1 \| q > k2<br>p <= k1 \| q > k2<br>p > k2 \| q <= k2<br>p <= k2 \| q <= k2 |

From the above, it can be seen that there may be a different number of timeseries and a different number of constrains in defining different states in a state set. In addition, the expressions used to define the relationship between the timeseries and constrains can vary but not always be the same in each state set. For example, in one state set, p>k is used to define a state, while in another state set, p>=k is used to define a state. In addition, when there are more than one timeseries and/or more than one constraints, the permutations may be used to define the relationships between the timeseries and constraints, to allow to cover the full state space. Overall, once the states in each state set are defined, a temporal state for a machine may be then determined within any arbitrary time period.

In some embodiments, the expressions used to define a set may be referred to as state definitions for a machine. In some embodiments, the state definitions defining different states of a machine may be presented in a JSON file format for implementation by the disclosed analytics system. The JSON file may include additional sections besides the state definition expressions, as shown in the following:

```
{
"name": "extruder_states",
"uuid": "xxxxxxxxxxxxxxx",
"state_definitions" : [
],
"input_timeseries" : [
]
"output_timeseries_template" : {
]
}
```

In some embodiments, the above JSON file may be referred to as "state specification,' since it specifies how to determine the temporal state of a machine. JSON stands for JavaScript object notation, which is a text format for storing and transporting data. This type of file provides a human-readable format for storing and manipulating data when developers build software. It was initially designed based on Javascript object notation but has since grown in popularity, so many different languages are compatible with JSON data. JSON is a lightweight data-interchange format that includes plain text written in JavaScript objection notation. JSON is self-describing and easy to understand, is used to send data between computers, and is language-independent. JavaScript may have a built-in function for converting a JSON string into a JavaScript object and/or another built-in function for converting an object into a JSON string. In the disclosed embodiments, a JSON schema grammar (named "SCHEMA_DEFN_state_setjson") may be used to parse the above state specification, and the schema grammar is shown in the following:

```
   "$schema": "http://json-schema.org/draft-07/schema#",
   "$id": "http://json-schema.org/draft-07/schema#",
   "title" : "State Set JSON schema definition",
   "description" : "This scheme defines how a state set should be defined.",
   "schema_version" : 1.0,
   "definitions" : {
       "ts_leaf_defn" : {
           "type" : "object",
           "properties" : {
               "metric" : { "type" : "string" },
               "tags" : { "type" : "object" }
           },
           "required" : ["metric", "tags"]
       },
       "fq_timeseries" : {
           "type" : "object",
           "properties" : {
               "ts_name" : { "type" : "string"},
               "ts_defn" : {
                   "$ref" : "#/definitions/ts_leaf_defn"
               }
           },
           "required" : ["ts_name", "ts_defn"]
       },
```

```
       "statement" : {
           "type" : "array",
           "items" : [
               { "type" : "string" },
               { "type" : "string",
                   "enum" : ["<", ">", "==", "<=", ">="] },
               {
                   "anyOf": [
                       { "type" : "number" },
                       { "type" : "integer" }
                   ]
               }
           ]
       },
       "state_defn" : {
           "type" : "object",
           "properties" : {
               "label" : { "type" : "string" },
               "expression" : {
                   "type" : "array",
                   "items": {
                       "$ref" : "#/definitions/statement"
                   }
               },
               "expression_operator" : { "const": "AND"}
           }
       }
   },
   "type" : "object",
   "properties" : {
       "name" : { "type" : "string" },
       "uuid" : { "type" : "string" },
       "state_definitions" : {
           "type" : "array",
           "items": {
               "$ref" : "#/definitions/state_defn"
           }
       },
       "query_params" : {
           "type" : "object",
           "properties" : {
               "msec_response" : {
                   "type" : "boolean",
                   "default": false
               }
           },
           "required" : ["msec_response"]
       },
       "input_timeseries" : {
           "type" : "array",
           "items": {
               "$ref" : "#/definitions/fq_timeseries"
           }
       },
       "output_timeseries_template" : {
           "type" : "object",
           "$ref" : "#/definitions/ts_leaf_defn"
       }
   },
   "required" : ["name", "uuid", "state_definitions", "input_timeseries",
"output_timeseries_template"]
}
```

In some embodiments, a running instance of a state specification may be referred to as an "applique." In other words, applique is a single instance of JSON file defined for a specific application, e.g., to generate and visualize extruder states. An applique may be considered as a mini-application to build and render a set of patterns for a specific well-scoped purpose. In the following Table 3, the specific meaning for each field included in a state specification is further described.

TABLE 3

Definition of state specification

| Field name | Data type | Purpose | Sub-field breakdown and description |
|---|---|---|---|
| name | Scalar | Human readable string describing the purpose of an applique. | "name": "extruder_states"<br>Description:<br>"name": A human readable name for an applique. |
| uuid | Scalar | A globally unique identifier to identify an applique. This ID is unique across all appliques. | It is used to tell apart applique instances. |
| state_definitions | List | Specifies a set of non-overlapping states. The expressions use timeseries IDs that are defined in the input_timeseries section. Only those timeseries IDs defined in the input_timeseries section can be used in an expression. | Single sample state:<br>{<br>  "label" : "PURGING",<br>  "expression" : [<br>    ["machine_power" "==", 1],<br>    ["melt_temperature", ">=", 115],<br>    ["screw_speed", ">=". 10],<br>    ["line_speed", "<", 5]<br>  ],<br>  "expression_operator" : "AND"<br>}<br>Description:<br>label: Name of the state. This label is what propagates through when viewing the output<br>expression: Combines a collection of statements as shown here.<br>expression_operator: Dictates how to combine the expression, such as "AND", "OR" among others. |
| input_timeseries | List | Fully qualified names of sensors are long. The long names are unwieldy to use in the state definition expressions. The input_timeseries section solves that problem. It allows you to create a short string to represent a timeseries ID. The short string can be in the state definition expressions. Furthermore, it requires a user to specify all the input timeseries that are relevant to an applique. This clearly captures the applique developers intent. | Single timeseries spec as input:<br>{<br>"ts_name" : "melt_temperature",<br>"ts_defn" : {<br>  "metric": "machine.sensor.melt_temp",<br>  "tags" : {<br>    "machine_type": "EXTRUDER",<br>    "unit": "deg_C",<br>    "machine_name" : "90mm_extruder",<br>    "machine_location" : "SIN",<br>    "machine_site" : "WCPL-1"<br>  }<br>}<br>}<br>Description:<br>ts_name: Defines a short name, e.g., "melt_temperature" for the actual timeseries which the entire block of text as defined by ts_defn. This name shortening allows an expression to simply read:<br>    melt_temperature >= 115<br>ts_defn: The fully qualified timeseries intend to use in some state specification. |

TABLE 3-continued

Definition of state specification

| Field name | Data type | Purpose | Sub-field breakdown and description |
|---|---|---|---|
| output_timeseries_template | Scalar | Each time an applique runs, it generates results by evaluating the state expressions over the time window of interest. Since those results are generated each time the applique runs, the results themselves are one or more timeseries. The output_timeseries_template specifies what timeseries should store the results. The number of timeseries generated equals the number of unique states specified in this applique, i.e., if the state_definitions section of the applique defines 4 states, a user will get 4 timeseries as result. | Sample output timeseries template:<br>"metric":<br>"quilt.extruder_states_fine"<br>,<br>"tags" : {<br>  "machine" ;<br>"90mm_extruder",<br>  "state_label" :<br>"PLACEHOLDER"<br>}<br>Description:<br>metric and tags are just defining fields for a new timeseries.<br>"state_label" : "PLACEHOLDER" makes this a template as explained below.<br>If the state_definitions section contains, say, 3 states:<br>state_definitions: {<br>  label: "state1"<br>  . . .<br>  label: "state2"<br>  . . .<br>  label: "state3"<br>}<br>Then when the output timeseries template spec is evaluated, it will generate 3 timeseries as output:<br>"metric":<br>"quilt.extruder_states_fine"<br>,<br>"tags" : {<br>  "machine" :<br>"90mm_extruder",<br>  "state_label" : "state1"<br>}<br>"metric":<br>"quilt.extruder_states_fine"<br>,<br>"tags" : {<br>  "machine" :<br>"90mm_extruder",<br>  "state_label" : "state2"<br>}<br>"metric":<br>"quilt.extruder_states_fine"<br>,<br>"tags" : {<br>  "machine" :<br>"90mm_extruder",<br>  "state_label" : "state3"<br>} |

From the above, it can be seen the number of timeseries output from an applique (or a running instance of the state specification) is equal to the number of possible states of the machine. As described earlier, the number of timeseries input into an applique is equal to the types of parameters or sensors for monitoring the machine. As also can be seen from the above table, each type of timeseries may have a unique timeseries ID and only those timeseries IDs defined in the input_timeseries section can be used in an expression. In this way, which timeseries data is input into which running instance of specification can be easily figured out. In addition, each applique may also have a unique ID that allows identifying the applique, among many possible appliques.

In some embodiments, the computing environment that runs a plurality of appliques may be considered as a running system. In other words, the running system in the disclosed analysis system is responsible for: 1) reading data in a JSON file to load an applique; 2) starting and/or stopping an applique based on the predefined triggers, such as {APPLIQUE_START|APPLIQUE_STOP}; 3) running an applique periodically, 4) accepting the server_IP:port to determine the times series database (TSDB) to connect to and supplying that information to the appliques being instantiated, and 5) logging all the appliques and errors if there is any.

It is to be noted that when running an applique periodically, different appliques may have different periods "D." In addition, state computation may use an intersection process to merge results within a state definition expression when there are multiple sets of timeseries data, as described further in detail below.

Intersect is an operator that combines two select statements and returns only the dataset that is common in both statements. To put it simply, it acts as a mathematical intersection. In mathematics, the intersection of A and B is the common data present in both A and B. Thus, when two SELECT queries are provided to combine, the SQL INTERSECT will only return the common rows from both the SELECT queries. An intersection process here may be similarly used to merge results with a state definition expression, according to some embodiments of the disclosure. For example, given an expression, e.g., "S: p>k1 and q<k2 and r>=k2," steps for expression evaluation and intersection may be as follows:
1. Query the backend for all input timeseries {p, q, r} for the time window of interest.
2. Evaluate each statement: "p f_op k".
3. Compute the intersection between two statements, or between the previously computed result and a statement. For example:
result=p>k1 and q<k2
result=result and r>=k2

In some embodiments, a cron-based implementation may be further configured to run the appliques periodically when evaluating the temporal state of a machine. The cron command-line utility is a job scheduler on Unix-like operating systems. Users who set up and maintain software environments use cron to schedule jobs (commands or shell scripts), also known as cron jobs, to run periodically at fixed times, dates, or intervals. It typically automates system maintenance or administration though its general-purpose nature makes it useful for things like downloading files from the Internet and downloading email at regular intervals. Cron is most suitable for scheduling repetitive tasks. Scheduling one-time tasks can be accomplished using the associated utility. Here the following is an example cron command-line utility that may be used to run an applique periodically:

applique periodically; 4) accepting the server_IP:port to determine the times series database (TSDB) to connect to and supplying that information to the appliques being instantiated; and 5) logging all the appliques and errors if there is any. Here, the TSDB may be co-located with the runtime system on the same host machine (either physical or virtual host) or may be located on different host machines.

From the above, it can be seen that the running system disclosed here includes a set of JSON files or appliques that ingest data obtained from timeseries database (e.g., in real-time) and generate outputs for the temporal states of a machine or device based on the state specifications. Each applique may run periodically based on cron-based implementation.

Figure 3:
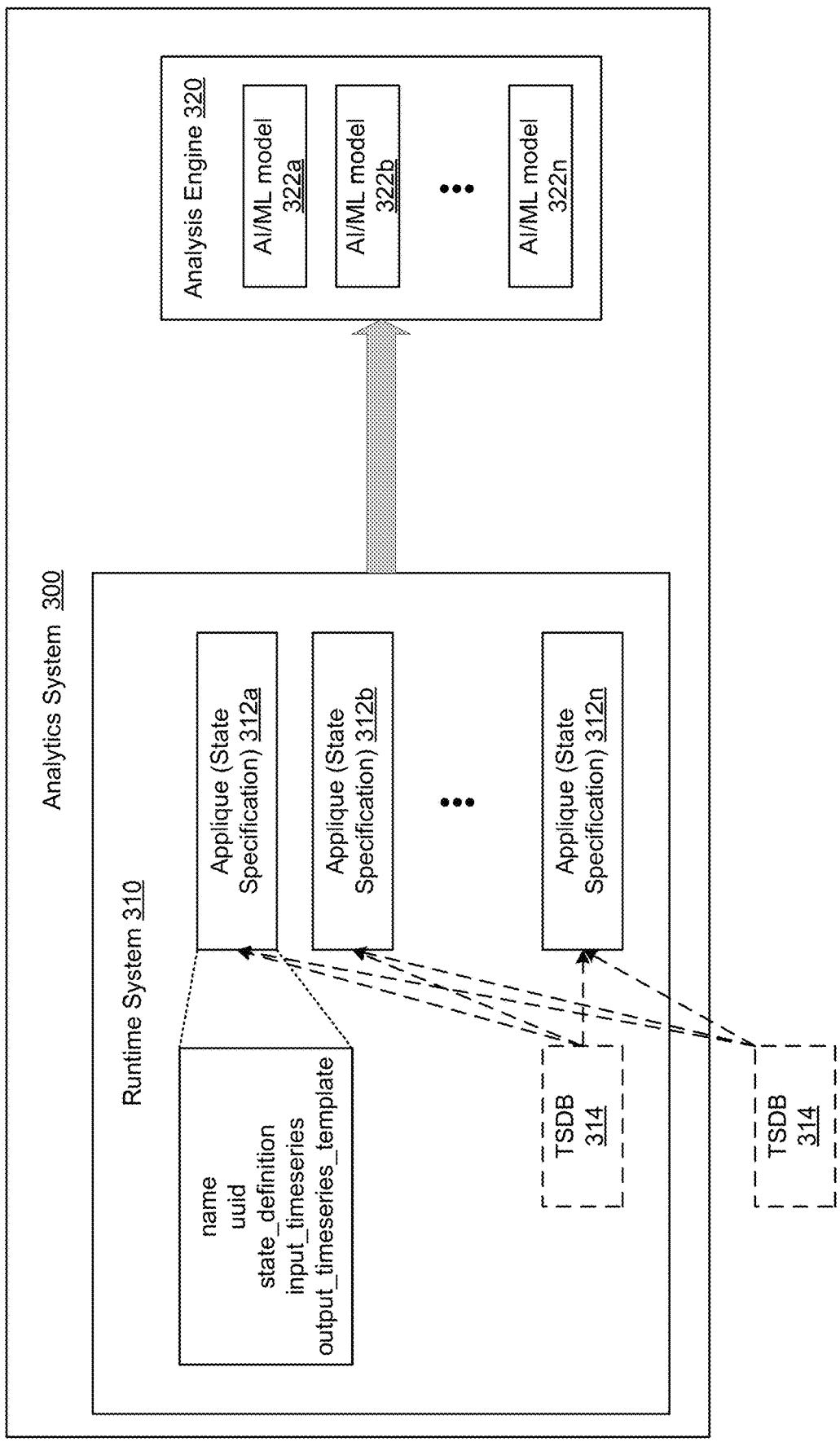
FIG. 3 depicts a block diagram of an example analysis system included in a temporal state monitoring system, according to embodiments of the disclosure.

FIG. 3 further illustrates an example analysis system 300 including a runtime system disclosed herein. The analysis system may be an analytics stack 220 as described in FIG. 2. As illustrated, the analysis system 300 may include a runtime system 310 and an analysis engine 320. The runtime system 310 may include specific components as described earlier. For example, the runtime system 310 may include a set of appliques 312*a*, 312*b*, . . . , 312*n* (together or individually referred to as "applique 312"), where each applique may be a state specification configured to determine a temporal state of a machine. The runtime system 310 may include a plurality of appliques that each is configured to determine a temporal state of a machine or one aspect of the temporal state of the machine. Each instance of applique or state specification may be a JSON file that has a specialized format, including name, uuid, state_definition, input_timeseries, and output_timeseries_template as described earlier. Each applique 312 may take timeseries data from the TSDB 314 (which may be locally or remotely located) to generate timeseries output in a specific format that represents the temporal states of a machine within a time window.

Figure 5:
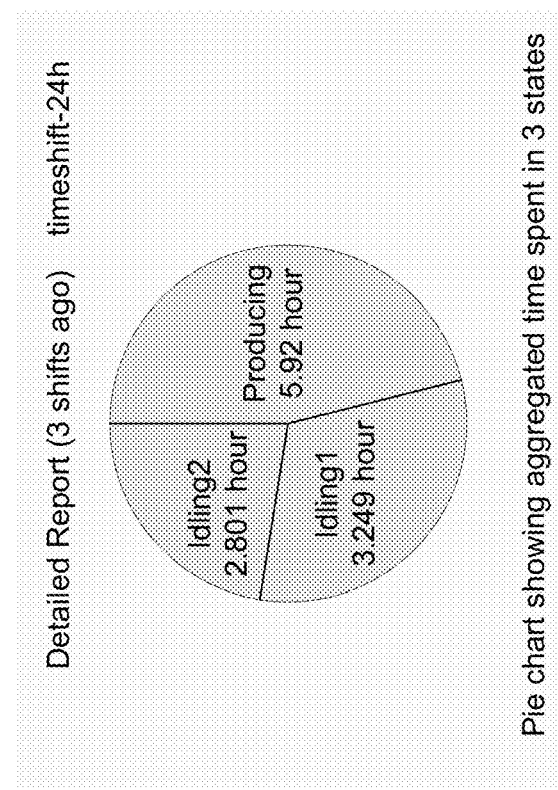
FIG. 5 depicts example charts for displaying generated temporal states of a device, according to embodiments of the disclosure.
Figure 5:
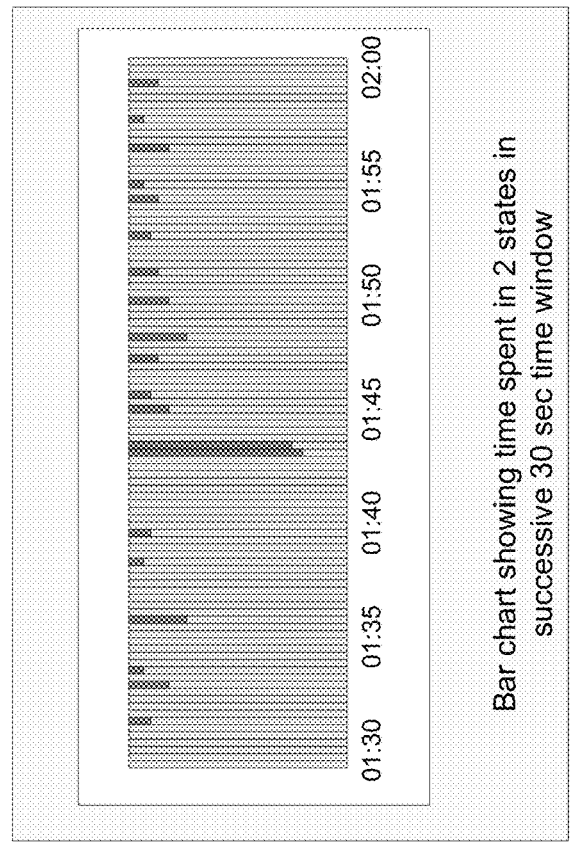

FIG. 5 illustrates example temporal states output by the appliques, according to some embodiments. Part (a) of FIG. 5 illustrates an example bar chart format, which is a disaggregated view that shows time spent in the two states in successive 30 seconds time window. Part (b) of FIG. 5 shows another example pie chart format, which is an aggregated view that shows aggregated time spent in three states. It should be noted that the two formats illustrated in FIG. 5 are merely for exemplary purposes but not for limitations,

```
last_12hrs_quilt.py
    from argus_quilt.state_set_processor_builder import StateSetProcessorBuilder
def main( ):
    applique_spec = "extruder_states_coarse_msec.json" # Applique spec
    schema_spec = "SCHEMA_DEFN_state_set.json" # Rules to parse applique
    builder = StateSetProcessorBuilder(schema_file, "localhost", 4242)
    with open(applique_spec) as file:
       state_set_json_schema = json.load(applique_spec)
       processor = builder.build(state_set_json_schema)
       computation_window_in_sec = (60*60*12) - 1 # seconds in 12hrs
       end = int(time.time( ))
       start = end - computation_window_in_sec
       processor.one_shot(start, end, computation_window_in_sec)
if __name__ == '__main__':
    main( )
crontab entry:
30 11,23 * * * /usr/bin/python3 /home/ubuntu/quilt/appliques/last_12hrs_quilt.py
```

This cron-based implementation is very effective at running one-off appliques, as all the requirements described above can be satisfied, including 2) starting and/or stopping an applique based on the predefined triggers, such as {APPLIQUE_START|APPLIQUE_STOP}; 3) running an and there may be additional formats that can be used to present the generated temporal states for a machine or device.

In some embodiments, the output temporal states for a machine may be further input into the analysis engine 320, which may generate additional insights based on the determined temporal states for a machine. As illustrated in FIG. 3, the analysis engine 320 may include one or more AI/ML models 322a, 322b, . . . , 322n (together or individually referred to as "AI/ML model 322). These models may be predictive models, classification models, or other types of models that may be used to generate insights based on the temporal states determined by appliques. For example, the AI/ML models may include one or more neural networks, such as convolutional neural networks (CNNs), recurrent neural networks (RNNs) that each is configured to perform data analysis to generate certain insights based on the determined temporal states of the machines. In one example, an AI/ML-based classifier may classify the temporal state of a machine as normal even if there is some noise. In another example, an AJ/ML-based predictive model may predict an anomaly, a potential risk, or a failure to occur in the coming hour with a 99% confidence based on the temporal state patterns identified from the timeseries data. In some embodiments, the AI/ML-based predictive models may consider additional information beyond the temporal states in generating insights. For example, when generating an operating or maintenance schedule, AI/ML models 322 may further consider the markets for the products. If the market is predicted to turn better (e.g., based on a predictive model included in the analysis engine), the schedule may be adjusted to manufacture more products in preparation for higher demands of the products. In some embodiments, the AI/ML-based predictive models may also generate certain operation recommendations to allow dynamic optimization of the operating parameters of a machine or device.

In some embodiments, while not shown in FIG. 3, the disclosed analysis system 300 may be coupled to an autonomous process control unit that may generate proper control signals based on the insights obtained from the analysis system 300. The control signals may allow an automatic adjustment of the operation of a machine without human involvement. For example, based on the insights generated from the analysis engine 320, the autonomous process control unit may generate control signals to adjust the operation of a machine, in hope of optimizing the performance (e.g., improving product efficiency) of the machine, or preventing potential risks, failures or anomalies, among others.

In some embodiments, instead of providing the generated insights to the coupled autonomous process control unit, the generated insights may be delivered to a user dashboard instead, for presenting the generated insights to the respective entities.

In some embodiments, each AI-ML model may be trained in advance before being deployed into the analysis engine for generating insights based on the temporal states. The training can be supervised training and unsupervised training and may use historical data that represent different types of operation states of a machine (including normal operation, certain anomalies, failure, accidents, and so on).

It should be also noted that while the AI/ML models are illustrated in FIG. 3, in actual applications, the analysis engine 320 is not limited to these models, but may include many other models that are not necessarily AI/ML driven. In addition, in some embodiments, artificial intelligence as a service (AIaaS) may be used instead. AIaaS is the third-party offering of artificial intelligence outsourcing. AIaaS allows individuals and companies to experiment with AI for various purposes without large initial investment and with lower risk.

In addition, as described earlier, since the output from an applique (i.e., an instance of running JSON file) may be used by almost any application, and thus the output from the runtime system 310 may be input into the analysis engine 320 without human manipulation. Accordingly, the insights may be generated by the disclosed analysis system 300 without requiring human involvement, and thus reflects a real automation process. In addition, since the autonomous control process is also an automation process, a machine can thus be controlled to run, stop (e.g., based on a schedule), optimize, and prevent potential risks, anomalies, or failure without human involvement, which makes the machine smarter or perform better with improved efficiency. The specific processes for monitoring the temporal states of machines are further described below by using an industrial plant as an example.

Figure 6:
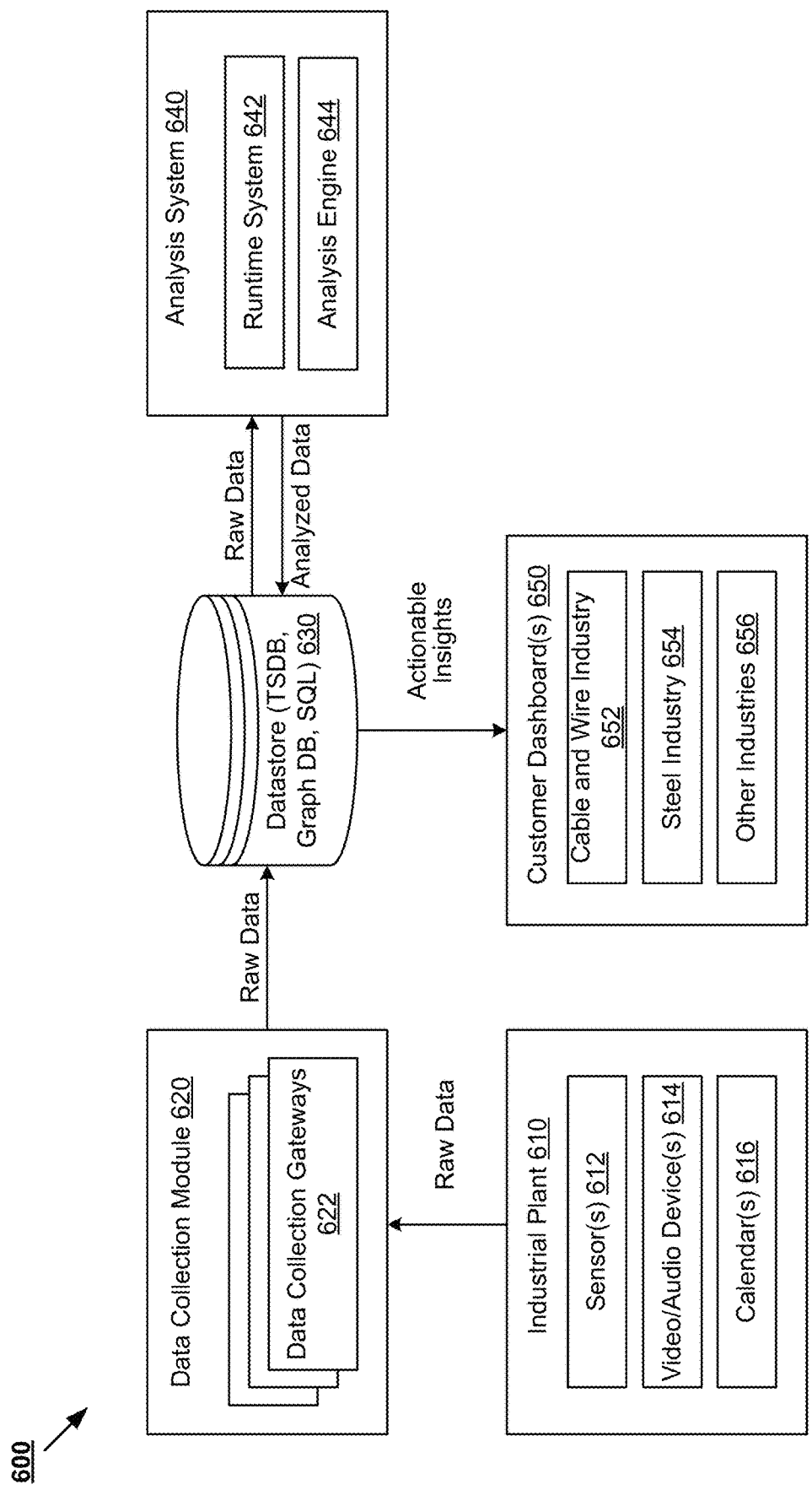
FIG. 6 depicts a block diagram of an example flow for monitoring the temporal state of an industrial plant, according to embodiments of the disclosure.

FIG. 6 illustrates an overall flow 600 for monitoring the temporal state of a machine in an industrial plant, according to some embodiments. As illustrated, industrial plant 610 may include one or more sensors 612 and/or video/audio device(s) 614 for monitoring machines in industrial plant 610. These sensors and video/audio devices may generate timeseries data when monitoring the machines in the industrial plant. The timeseries data may be raw data, such as analog or digital signals obtained by the sensors and video/audio devices. As illustrated, the industrial plant may also include one or more calendars 616 for operation and/or maintenance schedules.

The data collection module 620 may include one or more data collection gateways 622 configured to gather measurements from the sensors or video/audio devices in the industrial plant 610. A data collection gateway 622 serves as a central hub between interconnected devices and is designed to aggregate critical operation data from sensors and devices. For example, using a variety of industrial protocols, data collection gateway 622 may poll downstream energy meters at regular intervals, and post data to a database, such as datastore 630.

The datastore 630 may be a storage device configured to store various data obtained during the temporal state monitoring of the machines included in plant 610. As illustrated in FIG. 6, the datastore 630 may include one or more databases, such as TSDB for storing timeseries data, and a graph database for storing graphs (e.g., bar charts and pie charts as illustrated in FIG. 5). As illustrated, both raw data and analyzed data may be stored in the datastore 630. In addition, in some embodiments, the data stored in the datastore may also include intermediate data generated in the temporal state monitoring processes. In some embodiments, one or more databases included in the datastore 630 may be a SQL database, which is a collection of highly structured tables, where each row reflects a data entity, and every column defines a specific information field.

The data collection module 620 may either push data to the datastore 630 or let the datastore 630 pull data from the data collection module 620. By pushing data to the datastore 630, it is easier to replicate data to multiple destinations. However, the datastore 630 may have no control over how much data gets sent by the data collection module 620. By pulling data, the datastore 630 may have better control of how much data gets ingested and its authenticity.

The timeseries data stored in the datastore 630 may be raw data that is not analyzed. In some embodiments, the data collection module 620 may pre-aggregate the timeseries data before writing it to datastore 630. For example, it would not inefficient to write every measurement to the database right after each measurement. Accordingly, the data collection module 620 may pre-aggregate the data and write to the datastore 630 at regular intervals.

In some embodiments, the timeseries data collected from the sensors or video/audio devices may be processed in the analysis system 640, as described earlier. The analysis system 640 may be located locally or remotely from the datastore 630, and may include the runtime system 642 for generating timeseries output using appliques as described earlier. The analysis system 640 may also include an analysis engine 644 that includes one or more intelligent applications such as AI/ML-based models as described earlier. The intelligent applications may analyze the temporal states reported by the runtime system and generate one or more insights based on the temporal states of the machines included in plant 610. In some embodiments, the timeseries outputs generated by the runtime system 642 and/or the insights generated by the analysis engine 644 may be also stored in the datastore 630 as analyzed data or may be stored in another different datastore instead.

In some embodiments, the generated insights may include actionable insights, which can be forwarded to the associated autonomous process control unit for automatic control of the machines included in plant 610. In some embodiments, the generated actionable insights may be presented to a customer dashboard 650 for presentation to the respective entities for monitoring the temporal states of the machines included in plant 610. As also illustrated in FIG. 6, the customer dashboard 650 may be associated with a cable and wire industry 652, a steel industry 654, and many other industries 656. In other words, industrial plant 610 monitored by the disclosed temporal state monitoring system may be in many different types of industries.

It should be noted that while the data collection module 620 is illustrated as a separate unit from the industrial plant, under certain circumstances, the data collection module 620 may actually be a part of the industrial plant 610. In addition, while the data collection module 620, the database 630, and the analysis system 640 are described as separate units, in some embodiments, these different components may be integrated into a single unit (e.g., a single computing device). The different components included in a temporal state monitoring system are further described below.

Figure 7:
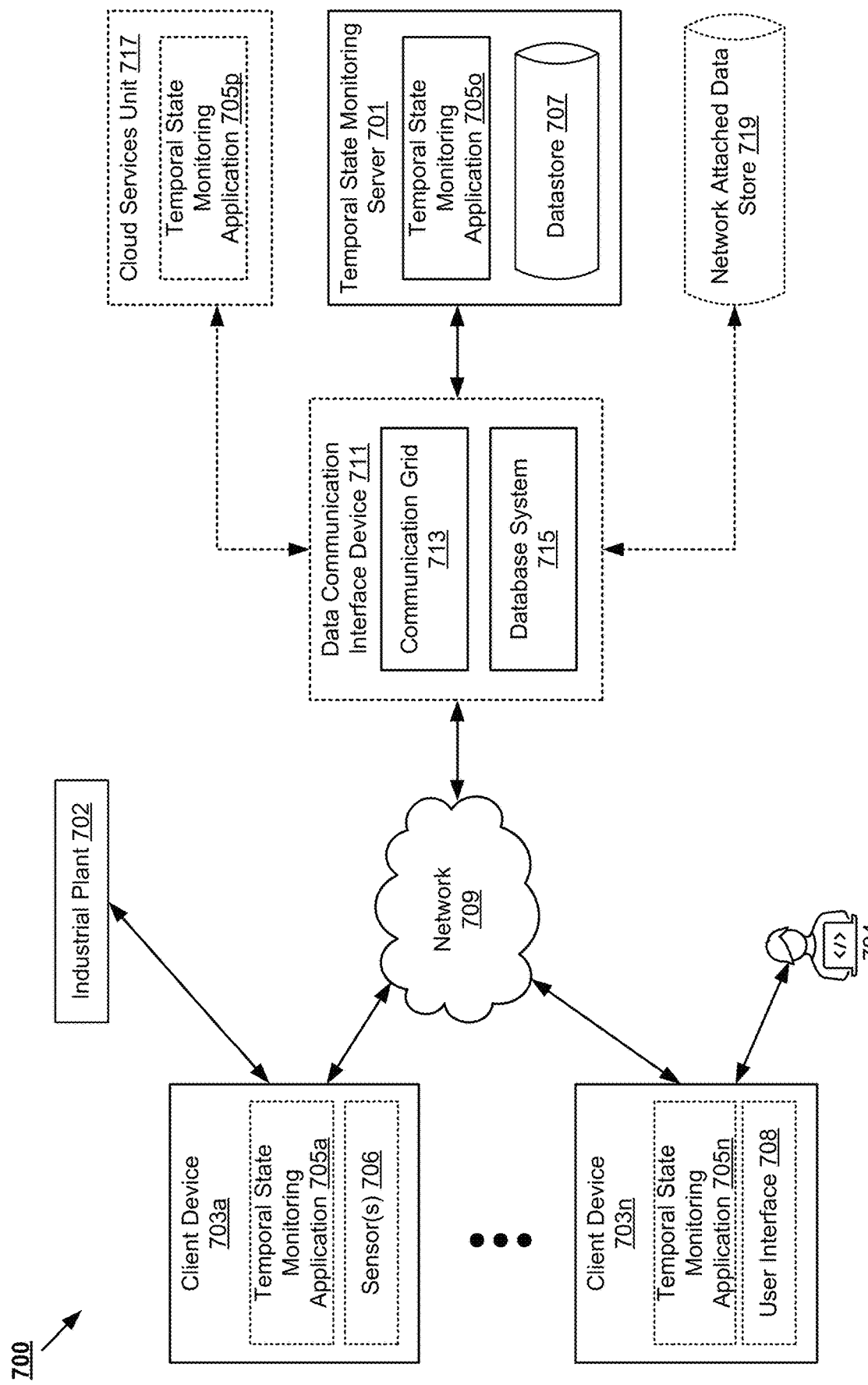
FIG. 7 depicts a block diagram of an example temporal state monitoring system, according to embodiments of the disclosure.

FIG. 7 illustrates a block diagram for a temporal state monitoring system 700, according to embodiments of the disclosure. Temporal state monitoring system 700 may be a localized/centralized or a network-based specialized computer environment configured to process a large amount of timeseries data, e.g., monitor temporal states of machines in real-time based on the timeseries data collected from sensors associated with machines. As illustrated in FIG. 7, the temporal state monitoring system 700 may include one or more specialized computers or other machines that are configured to collect, transmit, distribute, and/or process data received by the system. For example, the temporal state monitoring system 700 may include one or more user devices 703 that may communicate with other components of the system through a data communication interface device 711. For example, user device 703 may collect and send timeseries data to the data communication interface device 711 to be processed, and/or may send signals to the data communication interface device 711 to control different aspects of the system or the data it is processing, among other reasons. User device 703 may interact with the data communication interface device 711 in several ways, for example, over one or more networks 709. As shown in FIG. 7, data communication interface device 711 may include one or more other systems. For example, data communication interface device 711 may include a communications grid 713 for setting up communications with the user devices 703 and a database system 715 for storing data received and/or generated during the data processing processes.

In some embodiments, the user device 703 may provide a large amount of data, either all at once, at certain intervals, or streaming over a period of time, to the data communication interface device 711 via network 709. For example, user devices 703 may include sensors, audio or video devices, or other devices and the associated computing devices and/or databases, which may transmit or otherwise provide data to the data communication interface device 711. These devices may provide a variety of collected, generated, and/or stored data, such as timeseries data or data specific to the user devices themselves.

In some embodiments, in addition to collecting data (e.g., as received from user devices, such as sensors, audio or video devices, or other sources) to be processed as part of a timeseries data analytics project, user devices 703 may also receive data in real-time as part of a streaming analytics environment. For example, data may be collected using a variety of sources as communicated via different kinds of networks or locally. Such data may be received on a real-time streaming basis. For example, in some embodiments, user devices 703 may include specialized sensors 706 that monitor their environment or other devices to collect data regarding that environment or those devices, and such user devices may provide data they collect over time. For example, user devices 703 may receive data periodically from sensors associated with an industrial plant 702 as the sensors continuously sense, monitor, and track changes in their environments (e.g., the monitored machines in industrial plant 702). In some embodiments, such user devices 703 may include handheld or other mobile devices that include sensors to allow users to scan inventory products one by one or as a batch in generating operating and maintenance schedules for the industrial plant. After the inventory count, user device 703 may synchronize the collected data with the other components through the data communication interface device 711. In some embodiments, user devices 703 may also include devices within the internet of things (IoT), such as devices within a home automation network.

In some embodiments, user device 703 may also perform processing on data it collects before transmitting the data to data communication interface device 711, or before deciding whether to transmit data to data communication interface device 711. For example, user device 703 may determine whether the data collected meets certain rules, for example, by comparing data or values calculated from the data and comparing that data to one or more thresholds. User devices 703 may use this data and/or comparisons to determine if the data should be transmitted to data communication interface device 711 for data handling and/or processing. For example, if the timeseries data collected from the sensor 706 does not show any valuable signal (e.g., only noise), which may be not transmitted to avoid wasting the resources for data transmission and processing. In some embodiments, data with or without processing may be transmitted by user device 703 directly to data communication interface device 711 or network-attached data store, such as network-attached datastore 719 for storage so that the data may be retrieved later by the data communication interface device 711 or other portions of temporal state monitoring system 700.

In some embodiments, user devices 703 may include a set of devices that have different functions and components included therein. For example, the user device 703*a* may be a device configured for timeseries data collection, pre-aggregation, and/or pre-processing, among others. Accordingly, the user device 703*a* may be associated with the industrial plant (e.g., may be a monitoring device for monitoring a machine included in the industrial plant 702 or a monitoring unit associated with an IoT device or another different device). For another example, the user device 703*n* may be a device associated with a managing entity (e.g., a decision maker, a planner, a supervisor, or a process expert). The user device 703*n* may accordingly include a user interface 708 such as a customer dashboard for presenting insights (e.g., actionable insights) generated by the temporal state monitoring application 705*a*/705*n*/705*o*/705*p* for presenting to user 704.

Temporal state monitoring system 700 may also include one or more network-attached datastore 719. Network-attached datastore 719 may be configured to store data managed by the data communication interface device 711 as well as any intermediate or final data generated by the temporal state monitoring system 700 in non-volatile memory. However, in certain embodiments, the configuration of the data communication interface device 711 allows its operations to be performed such that intermediate and final data results may be stored solely in volatile memory, without a requirement that intermediate or final data results be stored in non-volatile types of memory, e.g., datastore 707 or network-attached datastore 719. This may be useful in certain situations, such as when the data communication interface device 711 receives intermediate data generated by the runtime system, the intermediate data may be stored solely in volatile memory before being forwarded to the analysis engine for analysis. In this non-limiting situation, the data communication interface device 711 may be configured to retain the processed intermediate data within memory.

Network-attached datastore 719 may store a variety of different types of data organized in a variety of different ways and from a variety of different sources. For example, network-attached datastore 719 may store unstructured (e.g., raw) data, such as timeseries data (e.g., a timeseries database containing records identifying operating parameters associated with an operating machine) or machine state databases (e.g., a database containing bar charts or pie charts generated from the timeseries data indicating the operating condition of a machine). The unstructured data may be presented to the data communication interface device 711 in different forms such as a flat file or a conglomerate of data records, and may have data values and accompanying timestamps. The data communication interface device 711 may be configured to analyze the unstructured data in a variety of ways to determine the best way to structure (e.g., hierarchically) that data, such that the structured data is tailored to a type of further analysis. For example, after being processed, the unstructured timestamped data may be aggregated by time (e.g., into daily time period units) to generate timeseries data and/or structured hierarchically according to one or more dimensions (e.g., parameters, attributes, and/or variables). For example, data may be stored in a hierarchical data structure, or may be stored in another tabular form.

Temporal state monitoring system 700 may also include a temporal state monitoring server 701. Data communication interface device 711 may route certain communications or data to temporal state monitoring server 701. Temporal state monitoring server 701 may be configured to process received data and/or provide feedback or other information according to a predetermined manner. For example, temporal state monitoring server 701 may access data stored therein for transmission in response to a communication (e.g., an inquiry for the temporal state of a machine). Temporal state monitoring server 701 may be separately housed from each other device within the temporal state monitoring system 700, such as data communication interface device 711, the user device 703, and/or may be part of a device or system, e.g., may be integrated with data communication interface device 711 to form an integrated server or may be integrated with user device 703 to form a local monitoring device in the industrial plant 702.

In some embodiments, temporal state monitoring server 701 may host a variety of different types of data processing as part of temporal state monitoring system 700, as described earlier. In addition, temporal state monitoring server 701 may also receive a variety of different data from user device 703, from data communication interface device 711, from cloud services unit 717, or from other sources. The data may have been obtained or collected from one or more sensors, as inputs from a control database, or may have been received as inputs from an external system or device. Temporal state monitoring server 701 may assist in processing the data by turning raw data into processed data based on one or more rules (e.g., rules governing the state specifications as described earlier) implemented by the server.

Temporal state monitoring system 700 may also include one or more cloud services units 717. Cloud services unit 717 may include a cloud infrastructure system that provides cloud services. In some embodiments, the computers, servers, and/or systems that make up the cloud services unit 717 are different from a user or an organization's own on-premise computers, servers, and/or systems. For example, the cloud services unit 717 may host an application (e.g., a temporal state monitoring application 705*p*), and a user may, via a communication network such as the Internet, order and use the application on demand. In some embodiments, services provided by the cloud services unit 717 may include a host of services that are made available to users of the cloud infrastructure system on demand. In addition, services provided by cloud services unit 717 may dynamically scale to meet the needs of its users. For example, cloud services unit 717 may house one or more temporal state monitoring applications 705*p* for timeseries data processing, which may be scaled up and down based on the amount of data to be processed. For example, for a plant that hosts a large number of machines that requires a large number of sensors to monitor different operating parameters of the machines, the cloud services may be provided by the cloud services unit 717 on-demand and/or scaled up.

Cloud services unit 717 is shown in FIG. 7 as being connected to data communication interface device 711, but in real applications cloud services unit 717 may be connected to or utilized by any of the devices in FIG. 7, e.g., by the user devices 703, and/or by temporal state monitoring server 701 as a part of the extension of the server. For example, cloud services unit 717 may perform certain AI/ML-based data analysis, while the temporal state monitoring server 701 is more focused on the temporal state determination using a runtime system, as described earlier.

Each communication within temporal state monitoring system 700 may occur over one or more networks 709. Networks 709 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or a combination of wireless interfaces. As an example, a network in one or more networks 709 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the system 700. The one or more networks 709 may be incorporated entirely within or may include an intranet, an extranet, or a combination thereof. In one embodiment, communications between two or more systems and/or devices may be achieved by a secure communications protocol, such as a secure sockets layer or transport layer security. In addition, data and/or transactional details may be encrypted.

Some aspects of the temporal state monitoring system 700 may utilize the IoT, where things (e.g., machines, devices, phones, sensors) may be connected to networks and the data from these things may be collected and processed within the IoT and/or external to the IoT. For example, the IoT may include sensors in many different devices, which may collect timeseries data for temporal state analysis of the devices to drive increased efficiencies (e.g., less power consumed by these IoT devices).

As noted, data communication interface device 711 may include a communications grid 713 and a database system 715. Communications grid 713 may be a grid-based computing system for handling and/or distributing large amounts of data into a proper component for processing. For example, communication grid 713 may distribute one type of timeseries data to a temporal state monitoring server specially configured for processing statistically forecastable timeseries data (e.g., for prediction purposes), and distribute another type of timeseries data to a temporal state monitoring server specially configured for processing non-statistically forecastable timeseries data (e.g., for state reporting purposes). For another example, communication grid 713 may distribute timeseries data to cloud services unit 717 when it finds that temporal state monitoring server 701 is busy processing other data.

The database system 715 may be configured for managing, storing, and retrieving large amounts of data that are distributed to and stored in one or more network-attached datastore 719 or other datastores that reside at different locations within database system 715. The computing nodes in the grid-based computing system 711 and the database system 715 may share the same processor hardware, such as processors that are located within data communication interface device 711.

In some embodiments, one or more components in the temporal state monitoring system 700 may include an instance of temporal state monitoring application (e.g., temporal state monitoring application 705a, . . . , 705n, 705o, 705p, together or individually referred to as "temporal state monitoring application 705). Each instance of temporal state monitoring application 705 may implement some or all functions related to temporal state monitoring. For example, the instance of temporal state monitoring application 705a/705n on a user device 703a/703n may collect the timeseries data and determine the temporal state of a machine using the runtime system described earlier. For another example, the instance of temporal state monitoring application 705o on the temporal state monitoring server 701 may perform certain AI/ML-based data analysis to generate actionable insights. In yet another example, the instance of temporal state monitoring application 705p in the cloud services unit 717 may instead perform the AI/ML-based data analysis. Other ways of distributing different functions among different instances of temporal state monitoring application 705 are also possible.

It should be noted that, while each device, server, and system in FIG. 7 is shown as a single device, it will be appreciated that multiple devices may instead be used. For example, a set of user devices may be used to transmit various communications from a single user or different users, or temporal state monitoring server 701 may include a server stack. As another example, data may be processed as part of data communication interface device 711. As yet another example, data communication interface device 711 may be a part of temporal state monitoring server 701, and cloud services unit 717 and/or network-attached datastore 719 may be not included in temporal state monitoring system 700.

Figure 8:
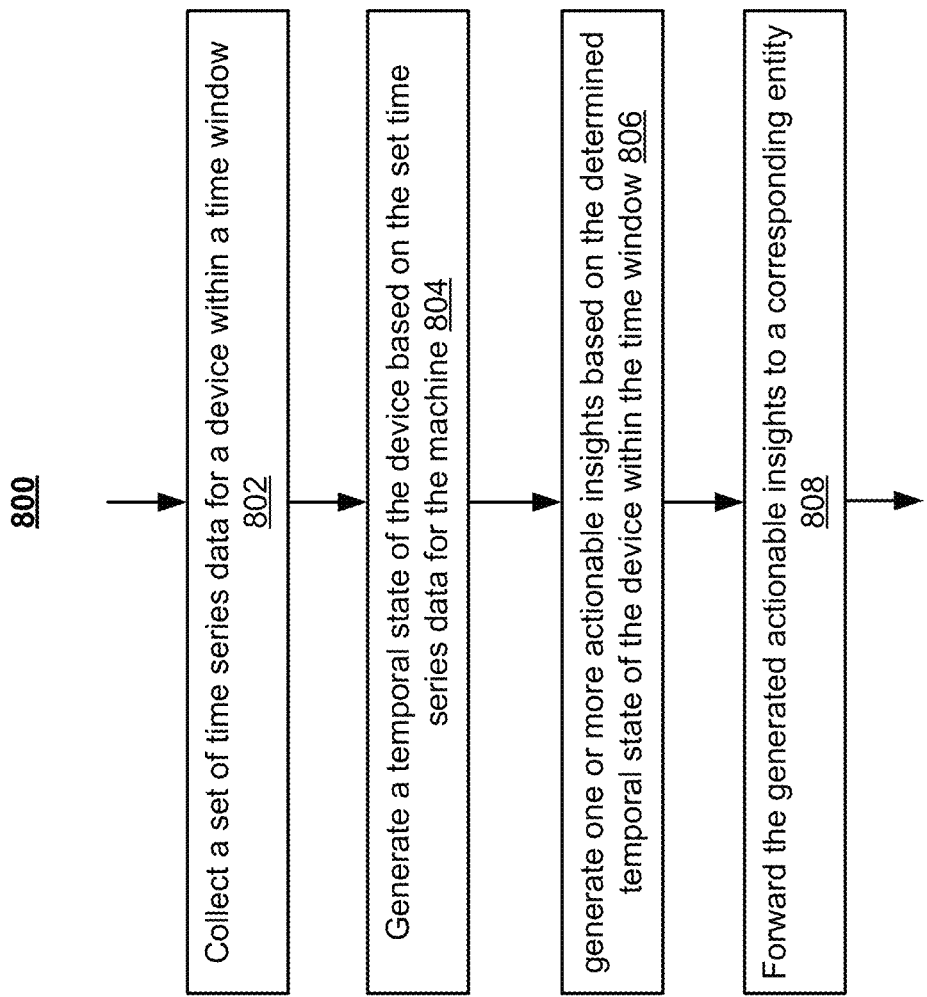
FIG. 8 depicts a flow chart of an example method for temporal state monitoring of a device, according to embodiments of the disclosure.

Referring now to FIG. 8, an example method for monitoring temporal state of a device is further described. According to some embodiments, the method may include a first step 802 to collect timeseries data associated with a device (e.g., a machine in an industrial plant, an IoT device, or another device that can be monitored by a sensor). The timeseries data may be collected by a sensing device (e.g., a sensor) or a set of sensing devices associated with the device. The timeseries data may thus include a set of timeseries data or a number of sets of timeseries data each corresponding to a sensor. In some embodiments, the timeseries data may be pre-aggregated.

At step 804, method 800 may further generate a temporal state of the device based on the collected timeseries data for the device. The temporal state may be generated by using an applique, which may be an instance of state specification. A state specification may be supplied in a JSON file, where a specifically configured JSON schema grammar may be used to parse a state specification. Each state specification may include a set of state definitions that each defines a possible operating state of the device. In addition, each state specification may include a name, a unique identifier, an input timeseries identifier, and an output timeseries template. In some embodiments, each state definition may include one or more statements, where each statement may define a relationship between a set of timeseries values and a predefined constraint. The predefined constraint may be a predefined threshold value, above, below, or equal to which may define a different operating state of a device. In some embodiments, states defined by a set of definitions defining all possible operating states of the device may be considered as a state set. In some embodiments, when a state set is defined between a single set of timeseries data and a single constraint, the states in the state set do not intersect each other. On the other hand, if a state set is defined between multiple sets of timeseries data and multiple different constraints, there may be an intersection process in generating temporal states of the device. In some embodiments, it is permissible to leave a certain part of state space undefined. In addition, permutations may be used in the statements included in the state definitions in a state specification.

At step 806, method 800 may further generate one or more actionable insights based on the determined temporal state of the device within a time window. The actionable insights may include one or more insights that include certain actions that can be taken to improve the performance of the device. For example, the actionable insights may include suggestions to adjust certain parameters in device operation. For another example, the actionable insights may include a warning that an anomaly may occur in a certain time (e.g., within an hour), and thus it may be better to shut down the device as soon as possible to prevent potential risks. In some embodiments, one or more AI/ML models may be used to generate actionable insights.

In step 808, method 800 may forward the generated actionable insights to a corresponding entity for taking certain actions. For example, the action insights may be forwarded to a customer dashboard, to draw the attention of a corresponding party in charge of the device. The actionable insights may be also generated on the fly, e.g., in response to an inquiry from a user, e.g., from a manager, scheduler, a process expert. In some embodiments, instead of forwarding the actionable insights to a user, method 800 may forward the actionable insights to an autonomous process control unit for autonomous control of the operation of the device. For example, the autonomous process control unit may generate one or more control signals for controlling the operation of the device without requiring additional human manipulation, thereby improving the automation process in an industrial plant.

The systems, methods, and products described herein are useful for big data analysis and/or processing. In one aspect, the disclosure provides tools for analyzing large sets of data, such as large sets of digital data, and converging them on a much lower amount of data within the data set. Aspects of the current disclosure provide technical solutions to the technical problem of how to efficiently sort, process, evaluate, and make use of large quantities of digital or electronic data. As such, the problem addressed by this disclosure specifically arises in the realm of computers and networks and this disclosure provides solutions necessarily rooted in computer technology. For example, in some embodiments, the disclosure is directed to more than just retrieving and storing the data sets and includes aspects that transform the data from one form into a new form by using various big data analysis techniques across multiple iterations that may include filtering, aggregation, prediction, determination, and reconciliation processes.

While this disclosure may contain many specifics, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Under certain circumstances, multitasking and parallel processing may be utilized. Moreover, the separation of various system components in the implementations described above should not be understood as requiring such separation in all implementations, and it should be understood that the described program components and systems may generally be integrated together into a single software or hardware product or packaged into multiple software or hardware products.

Some systems may use certain open-source frameworks for storing and analyzing big data in a distributed computing environment. Some systems may use cloud computing, which may enable ubiquitous, convenient, on-demand network access to a shared pool of configurable computing resources (e.g., networks, servers, storage, applications, and services) that may be rapidly provisioned and released with minimal management effort or service provider interaction.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system for monitoring a temporal state of a device, comprising:
   a processor; and
   a memory, coupled to the processor, configured to store executable instructions that, when executed by the processor, cause the processor to:
   collect a set of timeseries data within a time window, the timeseries data being collected from a sensor associated with the device;
   generate temporal states of the device within the time window based on the set of timeseries data, wherein the temporal states of the device are generated by running a state specification that includes a set of state definitions for defining different operating states of the device, and wherein the temporal states represent tracked operating states of the device in a manufacturing process of transforming raw materials to finished goods, and wherein the set of state definitions define operating states of the device during the manufacturing process;
   generate an actionable insight based on the temporal states of the device within the time window; and
   forward the actionable insight to a corresponding entity.

2. The system of claim 1, wherein, to collect a set of timeseries data within a time window, the executable instructions further include instructions that, when executed by the processor, cause the processor to:
   collect a number of sets of timeseries data within the time window, wherein each of the number of sets of timeseries data is collected from a corresponding sensor.

3. The system of claim 1, wherein the state specification is supplied in a JSON file.

4. The system of claim 3, wherein the state specification is parsed by a JSON schema grammar.

5. The system of claim 1, wherein each of the set of state definitions comprises one or more statements, each of the one or more statements defining a relationship between values of the timeseries data and a threshold value of a constraint.

6. The system of claim 1, wherein the all possible operating states of the device forming a state set for the device.

7. The system of claim 6, wherein, when the state set is defined by statements between values of a single set of timeseries data and a threshold value of a single constraint, states in the state set do not intersect each other.

8. The system of claim 1, wherein, to generate an actionable insight based on the temporal states, the executable instructions further include instructions that, when executed by the processor, cause the processor to:
generate a warning based on the temporal states of the device within the time window.

9. The system of claim 1, wherein, to generate an actionable insight based on the temporal states, the executable instructions further include instructions that, when executed by the processor, cause the processor to:
generate a recommendation to adjust one or more operating parameters of the device.

10. The system of claim 1, wherein the actionable insight is generated by using a machine learning model.

11. The system of claim 1, wherein, to forward the actionable insight to a corresponding entity, the executable instructions further include instructions that, when executed by the processor, cause the processor to:
forward the actionable insight to a user interface associated with a responsible entity.

12. The system of claim 1, wherein, to forward the actionable insight to a corresponding entity, the executable instructions further include instructions that, when executed by the processor, cause the processor to:
forward the actionable insight to an autonomous process control unit, to cause the autonomous process control unit to automatically adjust operation of the device.

13. A method of monitoring a temporal state of a device, comprising:
collecting a set of timeseries data within a time window, the timeseries data being collected from a sensor associated with the device;
generating temporal states of the device within the time window based on the set of timeseries data, wherein the temporal states of the device are generated by running a state specification that includes a set of state definitions for defining different operating states of the device, and wherein the temporal states represent tracked operating states of the device in a manufacturing process of transforming raw materials to finished goods, and wherein the set of state definitions define operating states of the device during the manufacturing process;
generating an actionable insight based on the temporal states of the device within the time window; and
forwarding the actionable insight to a corresponding entity.

14. The method of claim 13, wherein the state specification is supplied in a JSON file.

15. The method of claim 14, wherein the state specification is parsed by a JSON schema grammar.

16. The method of claim 13, wherein each of the set of state definitions comprises one or more statements, each of the one or more statements defining a relationship between values of the timeseries data and a threshold value of a constraint.

17. The method of claim 13, wherein the all possible operating states of the device forming a state set for the device.

18. The method of claim 13, wherein generating an actionable insight based on the temporal states comprises:
generate a warning based on the temporal states of the device within the time window.

19. The method of claim 13, wherein generating an actionable insight based on the temporal states comprises:
generating a recommendation to adjust one or more operating parameters of the device.

20. A computer program product tangibly embodied in a non-transitory machine-readable storage medium, including instructions configured to cause a data processing apparatus to perform operations comprising:
collecting a set of timeseries data within a time window, the timeseries data being collected from a sensor associated with a device;
generating temporal states of the device within the time window based on the set of timeseries data, wherein the temporal states of the device are generated by running a state specification that includes a set of state definitions for defining different operating states of the device, and wherein the temporal states represent tracked operating states of the device in a manufacturing process of transforming raw materials to finished goods, and wherein the set of state definitions define operating states of the device during the manufacturing process;
generating an actionable insight based on the temporal states of the device within the time window; and
forwarding the actionable insight to a corresponding entity.

* * * * *